(12) United States Patent
Fifelski, III

(10) Patent No.: US 12,208,440 B2
(45) Date of Patent: Jan. 28, 2025

(54) METHOD AND DEVICE FOR WELDING TOOL AUTOMATION

(71) Applicants: Canon Virginia, Inc., Newport News, VA (US); Francis Fifelski, III, Irvine, CA (US)

(72) Inventor: Francis Fifelski, III, Yorktown, VA (US)

(73) Assignee: Canon Virginia, Inc., Newport News, VA (US)

( * ) Notice: Subject to any disclaimer, the term of this patent is extended or adjusted under 35 U.S.C. 154(b) by 111 days.

(21) Appl. No.: 18/014,994

(22) PCT Filed: Jul. 8, 2021

(86) PCT No.: PCT/US2021/040890
§ 371 (c)(1),
(2) Date: Jan. 6, 2023

(87) PCT Pub. No.: WO2022/011139
PCT Pub. Date: Jan. 13, 2022

(65) Prior Publication Data
US 2023/0256502 A1    Aug. 17, 2023

Related U.S. Application Data

(60) Provisional application No. 63/049,366, filed on Jul. 8, 2020.

(51) Int. Cl.
| B29C 65/00 | (2006.01) |
| B22C 7/02 | (2006.01) |
| B29C 65/02 | (2006.01) |

(52) U.S. Cl.
CPC ............... B22C 7/02 (2013.01); *B29C 65/02* (2013.01); *B29C 66/0246* (2013.01)

(58) Field of Classification Search
CPC ........................... B29C 65/02; B29C 66/0246
See application file for complete search history.

(56) References Cited

U.S. PATENT DOCUMENTS

| 6,957,686 B2 | 10/2005 | Puffer, Jr. et al. |
| 11,273,509 B2* | 3/2022 | Matsuzaki ........... B23K 3/0346 |
| 2006/0169744 A1 | 8/2006 | Dunham et al. |
| 2012/0103160 A1* | 5/2012 | Shea ..................... B26D 1/225 |
| | | 83/698.41 |
| 2018/0272452 A1 | 9/2018 | Clark et al. |

FOREIGN PATENT DOCUMENTS

| CN | 202155625 U | 3/2012 |
| CN | 103963296 A | 8/2014 |
| CN | 109483002 A | 3/2019 |
| CN | 110842137 A | 2/2020 |
| EP | 3 115 142 A1 | 1/2017 |
| EP | 3450328 A1 | 3/2019 |

(Continued)

*Primary Examiner* — Philip C Tucker
*Assistant Examiner* — Nickolas R Harm
(74) *Attorney, Agent, or Firm* — Canon U.S.A., Inc., IP Division

(57) ABSTRACT

The present disclosure relates to a hot knife having a removable blade or tip that has been specifically designed to perform knife joining operations. The knife is mounted to a quick change tool that connects to the end of a robotic arm.

14 Claims, 2 Drawing Sheets

(56) References Cited

FOREIGN PATENT DOCUMENTS

| | | | |
|---|---|---|---|
| GB | 565514 | A | 11/1944 |
| JP | H04-266446 | A | 9/1992 |
| JP | H11-221670 | A | 8/1999 |
| JP | 2003-001375 | A | 1/2003 |
| JP | 2013-538696 | A | 10/2013 |
| JP | 2017-019012 | A | 1/2017 |

\* cited by examiner

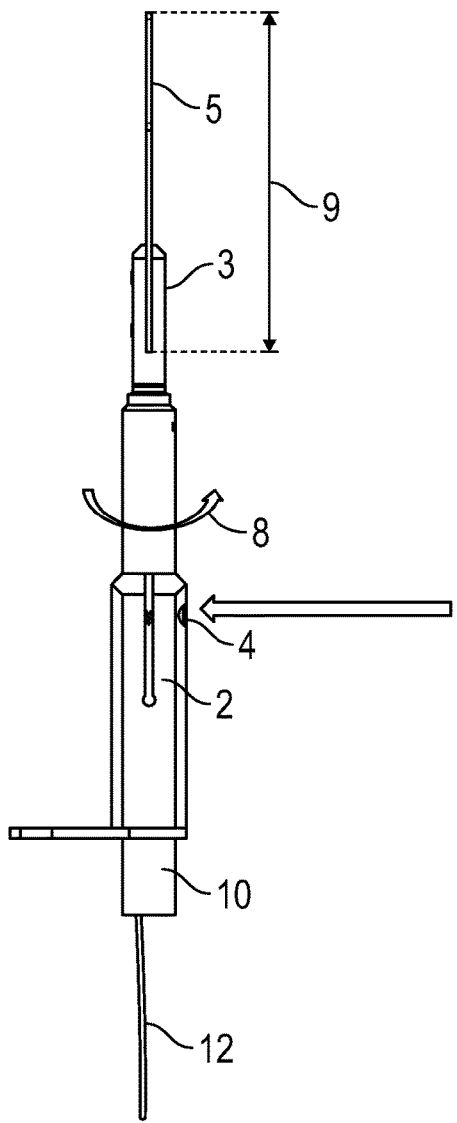 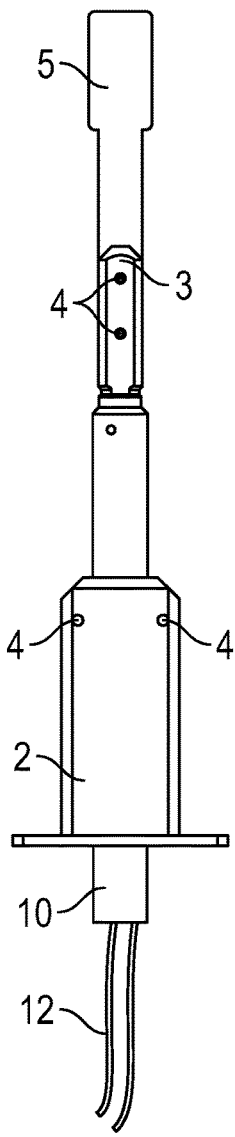
FIG. 2	FIG. 3
FIG. 4

METHOD AND DEVICE FOR WELDING TOOL AUTOMATION

PRIORITY AND INCORPORATION BY REFERENCE

The present application is the National Phase filing of International Patent Application No. PCT/US2021/040890 filed Jul. 8, 2021, which claims priority to U.S. Provisional Application Ser. No. 63/049,366 which was filed Jul. 8, 2020, the disclosure of which is incorporated herein by reference in its entirety.

TECHNICAL FIELD

The present disclosure relates to methods and devices for use in the automated assembly and/or preparation of wax molds usable in lost wax casting.

BACKGROUND

The casting of metal objects using a lost wax process is an ancient and well-known process that is still widely used in areas including the manufacture of jewelry, dentistry, the arts, and industry. When used for industry, lost wax casting may also be referred to as investment casting, and is commonly used in engineering and manufacturing applications to create precision metal parts.

Traditionally, lost wax casting is a manual process; the wax molds are assembled by hand, which is a labor-intensive, time-consuming operation and allows for a high degree of variation in part placement. An operator would gather all of the necessary parts and then start the assembly process. Using templates, hot irons, melted wax and other methods they would assemble the molds' multiple parts following the work standards for the specific wax mold. During the assembly process, an operator would have to place each part in its specific location, customizing multiple parts to fit by trimming and melting to size, then placing them in the desired location.

To verify that each part on the wax mold meets the finished product's quality requirement the wax mold is then transferred to an inspection station. At the inspection station, the operator manually verifies each part and its supporting structures position by sliding a template over each part/structure one at a time, rotating the wax mold's assembly to verify each location.

The steps in lost wax casting include those found in FIG. 4, namely wax injection, pattern assembly, shell making, de-waxing, metal pouring, and shell removal, resulting in a finished product. In this process a wax mold is dipped in a ceramic slurry which hardens to form a ceramic shell (shell making) The wax mold is constructed by assembling wax parts in the form of a weldment. These parts are created through injection molding, 3d printing, or other (usually additive) manufacturing methods. These solid wax parts are welded (fused) together by hand using a hot iron, molten liquid wax, or a combination of both.

The shell is then heated and wax is removed (de-waxing). The next step in the process is normally metal pouring, but it sometimes is necessary to perform additional preparation of the shell prior to metal pouring (shell prep), which can include the intentional fracturing and removal of portions of the ceramic shell.

Attempts to automate this process requires precise accuracy of its component parts and each step of the process, including placement and welding of the mold parts, as well as measurements and inspection of the mold.

More particularly, the assembly of wax molds typically uses commercial soldering knifes with varying tip sizes and shapes. These various welding knifes are used to heat and melt wax pieces together in specific locations to form a master part for casting. This process is a manual operation, and typically employs commercially available or homemade hand held soldering knifes.

Assembling wax patterns in automation typical adopts legacy manual tools with new end of arm tooling (EOAT) brackets. Replacement or crash recovery processes in automation are not consistent and can have many inconsistencies. Furthermore, multiple hot knife tip sizes or extensions are commonly utilized to perform various welds and reach various areas. The orientation of how the knife touches the part can still vary due to the adaptation of manual tools which have no keying features or repeatable extension length.

Once the transition to automation is made, excess labor and technical skill is still required to re-orient the hot knife tip and re-program the robot into the correct position compensate for the lack of hot knife orientation features in the EOAT/automation.

SUMMARY OF THE DISCLOSURE

According to aspects of the present disclosure, there is provided a hot knife comprising a knife blade or tip that has been specifically designed to perform knife joining operations. The knife is mounted to a quick change tool that connects to the end of a robotic arm, and the robotic arm is programmed to provide advantages for automated mold welding.

According to other aspects of the present disclosure, there is provided an automated method of performing knife joining operations comprising providing a robotic arm which is connected to a hot knife having a removable blade.

According to still other aspects of the present disclosure, there is provided a welding device comprising a robotic arm having a hot knife removably attached thereto.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

The accompanying drawings, which are incorporated herein and form part of the specification, illustrate various embodiments, objects, features, and advantages of the present disclosure.

FIG. 2 is a side view of an exemplary replaceable knife tip attached to a quick change mounting fork.

FIG. 3 is a top view of an exemplary replaceable knife tip attached to a quick change mounting fork.

FIG. 4 depicts a process diagram of the investment casting process.

Figure 1:
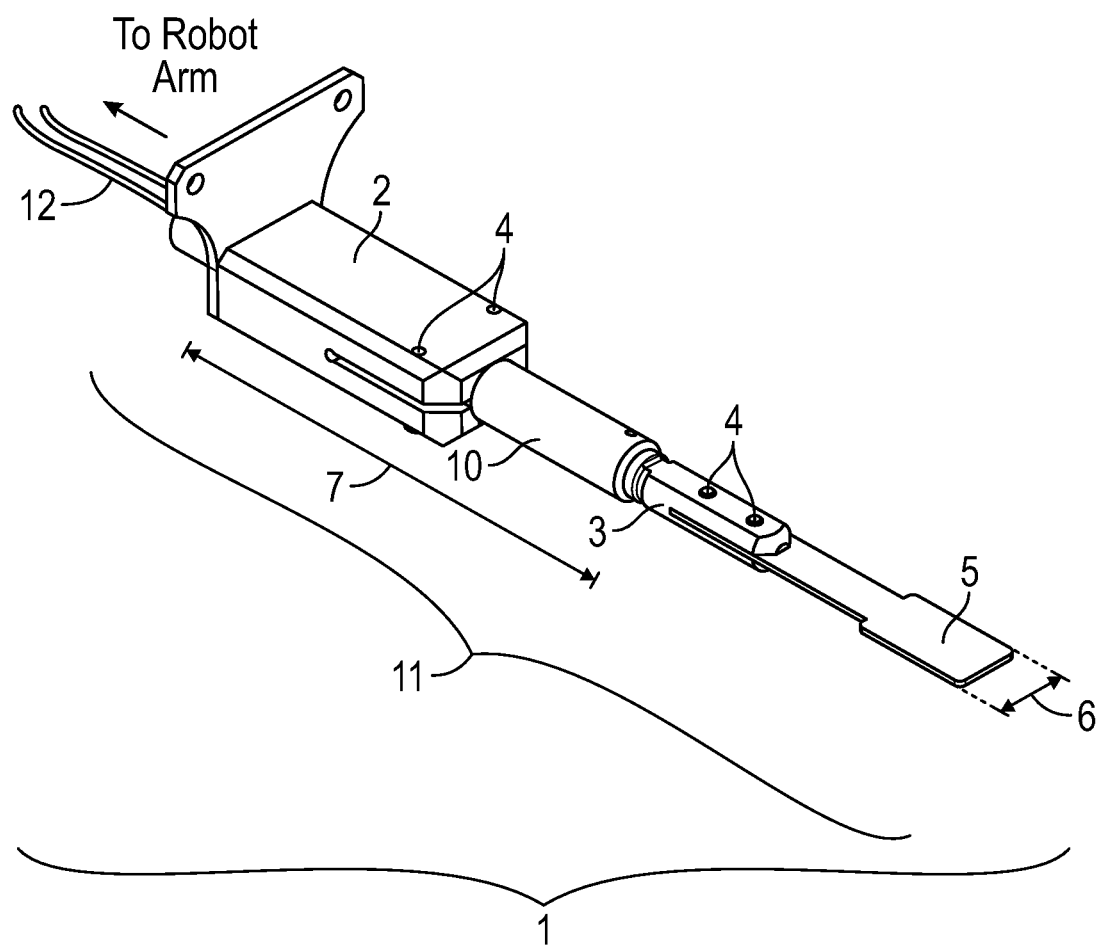
FIG. 1 depicts an exemplary replaceable knife tip attached to a quick change mounting fork.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENT

Exemplary embodiment(s) of the present disclosure will be described in detail below with reference to the accompanying drawings. It is to be noted that the following exemplary embodiment(s) are merely examples for implementing the present disclosure and can be appropriately modified or changed depending on individual constructions and various conditions of apparatuses to which the present disclosure is applied. Thus, the present disclosure is in no way limited to the following exemplary embodiment(s). It is particularly noted that any of the described embodiments can be combined with other embodiments, even if not explicitly provided in combination herein.

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

The present disclosure is useful in automation of the knife joining operations, such as those used in the wax mold assembly process. Although the present disclosure is broadly applicable to any process using such knife joining operations, the present disclosure will use the assembly of wax molds as an exemplary embodiment. Automation of the wax mold assembly process can include the use of one or more robots to obtain, position, and weld wax mold components to form the finished mold. Such automation can include the use of End of Arm Tooling (EOAT), whereby the distal end of an arm of one or more robots is configured to accept one or more tools for use in the mold assembly process. In some embodiments, such configuration can include a quick change tool such as a quick change mounting fork removably attached to the distal end of the robotic arm. Throughout the disclosure, "quick change mounting fork" will be used, however, such item is a non-limiting example of a quick change tool that can be utilized by the present disclosure, and other similar tools can be used in the alternative. Said quick change mounting fork can facilitate fast and simple tooling changes, wherein the quick change mounting for is opened or loosened, for instance by the loosening of screws or other similar fasteners, allowing the current tooling to be slideably removed from the quick change mounting. Upon removal, the desired tooling is the slideably inserted into the quick change mounting fork, and the screws or other fasteners are tightened or closed, holding the desired tooling in place. In one embodiment, the desired tooling is inserted to the desired depth within the quick change mounting fork, and or is rotated within the quick change mounting fork to position the tool at the desired angle with respect to the robotic arm. In certain embodiments, the desired tooling and the quick change mounting fork can include positioning guides, for example, in the form of guides or grooves, to assist in alignment. In other embodiments, the automated robotic system may align the quick change mounting fork and the desired tooling based on, for instance, pre-programmed coordinates or optical feedback.

In certain embodiments, the desired tooling can be a hot knife. A hot knife can comprise a blade and a handle, wherein the knife is configured to heat the blade to a desired temperature. In such an embodiment, the handle may have a proximal end and a distal end, wherein the proximal end is configured to be inserted into the quick change mounting fork on the distal end of a robotic arm. Such hot knife can be electrically connected to a power supply, or which electrical connection or power supply itself, can be integrated into the robotic arm. In certain embodiments, the proximal end of the hot knife handle is configured to be inserted into the robotic arm's quick change mounting fork. The proximal end of the handle can be any applicable shape, such that the proximal end of the handle will removably mate or engage with the robotic arm's quick change mounting fork when inserted. In certain embodiments, the proximal end of the handle is shaped to allow for rotation within the quick change mounting fork. Such rotation can be freely performed over 360°, or such rotation can have certain limited configurations. In those instances where rotation can be freely performed, for instance, the proximal end of the handle can be cylindrical and the quick change mounting fork can be configured to accept a matching cylindrical item, such that rotation can occur after the handle has been inserted into the quick change mounting fork. In another non-limiting embodiment, the proximal end of the handle and the quick change mounting fork could each be shaped as, for instance, a triangle, square, polygon, etc., such that while the proximal end of the handle could be rotated prior to insertion in the quick change mounting fork, the rotation would have to match the corresponding shape of the quick change mounting fork (e.g., if the handle has a square shape, and the quick change mounting fork is configured to have a corresponding square opening, the handle can be rotated set amount, such as 90°, 180°, 270° or 360°). In further embodiments, the proximal end of the handle can be configured such that insertion of the handle into the quick change mounting fork on the distal end of a robotic arm provides an electrical connection to heat the blade. In certain embodiments, the heating of the blade can be controlled directly by the user. In other embodiments, the heating of the blade can be controlled by pre-programmed instructions executed by the robot or by a system that comprises such robots.

In some embodiments, the hot knife can comprise a handle with interchangeable blades, such that the user can select a blade as would be applicable for a desired utility. The distal end of the handle can comprise a mounting fork that is configured to accept and hold a desired blade. In certain embodiments, the blade mounting fork may be of a pinch-clamp or other suitable type. The blade mounting fork can be secured around the selected blade by screws or other similar hardware. The blade mounting fork can have an opening suitable to receive the desired blade, such as a slit opening, a rectangular opening, or other suitable shape. In some embodiments, the blade mounting fork opening can have a groove, channel, or an indentation that will mate to a corresponding protrusion on the blade (or vice versa) to ensure a particular alignment of the blade in the blade mounting fork. An exemplary blade for use in the present disclosure can have differing widths, shapes, sizes, or can be made of different materials, according to the desired usage. In certain embodiments, the blade can be a solid piece of material, or it can be shaped such that the blade is an outline of a desired shape with an open center.

During the wax mold assembly process, pieces of the mold can be attached together by creating a weld joint; essentially, a heated component, such as a hot knife blade or tip, contacts the wax for a desired amount of time to cause a desired degree of melting, and the melted wax creates a weld joint between mold components. In certain embodiments, the length of time the heated component touches the wax is determined by pre-programmed instructions executed by the robot or by a system comprising the one or more robots. In other embodiments, the length of time the heated component touches the wax is determined by the user at the time of use. The specific location where the heated component touches the wax can be determined by pre-programmed instructions executed by the robot or by a system comprising the one or more robots. Alternatively or in addition, a user can directly cause the robotic arm to touch a heated component to a wax mold at a desired location. By automating the wax joining process using the presently disclosed hot knife, consistency in weld joints is provided and a higher quality part is created due to the inherent repeatability of the automated process. This repeatable quality and/or reproducibility enabled by the automated process will remain even when the process is performed by different technicians.

The presently disclosed hot knife for use as an end of arm tooling with a robotic arm also provides additional improvements to the process of making wax molds, and to the resulting mold itself. Use of the present disclosure can streamline the process by reducing maintenance and downtime due to the ability to quickly change the replaceable blade while preserving the blade orientation through keeping the knife handle locked into position within the quick change mounting fork. Blade length is also maintained by the locked knife handled, as well as through the design of the blade mounting fork having a specific depth at which the blade is inserted.

Further, it is within the scope of the present disclosure that the quick change mounting fork can be easily removed and replaced by alternate versions, and that the quick change mounting fork accepts and allows for any desired knife configuration. The quick change mounting fork will retain the tool coordinate position even when changes to the tool itself are made.

In another embodiment, the present disclosure allows for automation features such as extension and retraction of overall length of the hot knife and the robotic arm itself, providing the ability of the hot knife to reach into confined spaces on the part being assembled. Further, the automation provided by the present disclosure provides specific timing when the hot knife touches the substrates (i.e., wax molds), thereby cutting down on defects that can result from too short or too longer of a contact time. In another embodiment, the modular nature of the quick change mounting fork allows the automated system to function universally to perform all desired welds (with different knife blades or tips as required).

There is therefore provided as an embodiment of the present disclosure an automated method of welding wax molds comprising providing a robotic arm having a proximal end and a distal end; wherein the distal end of the robotic arm comprises a quick change tool removably attached thereto; providing a hot knife removably inserted into the quick change tool; wherein the hot knife comprises a handle, blade mounting fork, and a knife tip; heating the knife tip to a desired temperature; moving the robotic arm such that the knife tip contacts a desired weld location; and holding the knife tip at the desired weld location for a pre-determined period of time.

In a further embodiment, the robotic arm is programmed to move the knife tip to the same location to weld the desired weld location on successive wax molds. The robotic arm can also be programmed to weld more than one desired weld location successively on a single wax mold. In another embodiment, the desired weld location has a consistent weld joint size between successive wax molds.

In another embodiments, the blade mounting fork locks the knife blade into a defined position having a desired depth. The hot knife can be moveable laterally within the quick change tool and/or can be rotatable within the quick change tool. Once in position, the hot knife is locked into position by the quick change tool.

Additionally provided is a welding device comprising a robotic arm having a proximal end and a distal end; wherein the distal end of the robotic arm has a quick change tool removably attached thereto; and, a hot knife removably inserted into the quick change tool; wherein the hot knife comprises a handle, blade mounting fork, and a knife tip.

In certain embodiment, the blade mounting tool locks the knife tip into a defined position have a desired depth. In another embodiment, the quick change tool is a pinch clamp style mount. The pinch clamp style mount allows for movement of the hot knife handle along the x-axis (lateral movement) and/or the pinch clamp style mount allows for rotational movement of the hot knife handle. The robotic arm can be configured to move the knife tip to a desired position for a pre-determined amount of time.

Further provided is a hot knife comprising a handle, a blade mounting fork, and a blade or tip. The blade can be removably attached to the blade mounting fork. Further, the hot knife can be configured to removably attach to a robotic arm.

With reference to the FIG. 1, an automated hot knife 11 (comprising a handle 10, blade mounting fork 3, knife blade or tip 5 and optionally electrical connection 12) has been specifically designed to perform knife joining operations, for instance, in the process of making wax molds. The hot knife 11, in combination with quick change tool 2, comprises the end of arm tooling 1. The hot knife 11 is mounted to a quick change tool 2 (which can be a quick change mounting fork) that connects to the end of a robotic arm. The robotic arm is programmed such that the knife moves to the same location for each weld joint. The time the knife contacts the wax is specifically set for each weld joint, allowing repeatability.

The quick change tool 2 accepts the knife handle 10, and allows for a wide range of adjustment of the handle 10 within the quick change tool 2 along the x-axis 7, thereby allowing the user (including via an automated system) to accurately provide the appropriate placement of the knife 11 in the quick change tool 2 based on the intended usage. The knife 11 can also be rotated about the x-axis. Once in place, the knife handle 10 is locked into position using locking fasteners 4. The locking of the knife 11 into the quick change tool 2 allows for replacement of the knife blade or tip 5 without loss of knife 11 orientation.

Similarly, the blade mounting fork 3 is attached to the distal end of knife handle 10 and accepts knife blade or tip 5. Knife blade or tip 5 can be easily replaced within the blade mounting fork 3 as necessary. Knife blade or tip 5 can be changed or replaced to provide a knife blade or tip 5 having a different width 6 or different profile based on the join to be performed. Each application that uses the hot knife 11 can be optimized by determining a specific width of knife blade or tip 5 that is to be used. The width 6 of the welding knife blade or tip 5 can be designed to heat the entire desired weld joint surface at one time. This allows for consistent contact surface between parts, leading to a consistent weld joint and adhesion.

The blade mounting fork 3 allows for such replacement of the knife blade or tip 5 without loss of orientation, as the mounting fork 3 allows the replacement of the knife blade or tip 5 into the exact location as the prior blade.

FIG. 2 provides a side view of the hot knife 11. The blade mounting fork 3 accepts knife blade or tip 5, such that the depth of the replaceable knife blade or tip 5 acts as a positive location feature 9, ensuring that each successive changed blade is located in the same position as the prior blade. Knife handle 10 can be moved both laterally within quick change tool 2, as well as rotationally within quick change tool. Once in the desired position, locking fasteners 4 can be tightened closing the sides of the quick change mounting fork 2 around the knife handle 10, and locking it into position. In this manner, the replacement of a knife blade or tip 5 will not alter the positioning of hot knife 11, and the position/orientation of the knife blade or tip 5 will be maintained, including, for instance, during maintenance change-overs, once the specified position has been established.

FIG. 3 shows a top view of hot knife 11, in particular showing the placement of knife blade or tip 5 in blade mounting fork 3, as held or locked in place by locking fasteners 4. The blade mounting fork 3 is mounted on the distal end of the knife handle 10, which in turn is received into the quick change tool 2, and is held or locked in place by additional locking fasteners 4.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. An I/O interface can be used to provide communication interfaces to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An automated method of welding wax molds comprising:
    providing a robotic arm having a proximal end and a distal end; wherein the distal end of the robotic arm comprises a quick change tool removably attached thereto;
    providing a hot knife removably inserted into the quick change tool; wherein the hot knife comprises a handle, blade mounting fork, and a knife tip;
    heating the knife tip to a desired temperature;
    moving the robotic arm such that the knife tip contacts a desired weld location; and
    holding the knife tip at the desired weld location for a pre-determined period of time.

2. The method of claim 1, wherein the robotic arm is programmed to move the knife tip to the same location to weld the desired weld location on successive wax molds.

3. The method of claim 2, wherein the desired weld location has a consistent weld joint size between successive wax molds.

4. The method of claim 1, wherein the robotic arm is programmed to weld more than one desired weld location successively on a single wax mold.

5. The method of claim 1, wherein the blade mounting fork locks the knife blade into a defined position having a desired depth.

6. The method of claim 1, wherein the hot knife is moveable within the quick change tool.

7. The method of claim 6 wherein the hot knife is locked into position by the quick change tool.

8. The method of claim 1, wherein the hot knife is rotatable within the quick change tool.

9. A welding device comprising:
    a robotic arm having a proximal end and a distal end; wherein the distal end of the robotic arm has a quick change tool removably attached thereto; and,
    a hot knife removably inserted into the quick change tool; wherein the hot knife comprises a handle, blade mounting fork, and a knife tip.

10. The device of claim 9, wherein the blade mounting tool locks the knife tip into a defined position having a desired depth.

11. The device of claim 9, wherein the quick change tool is a pinch clamp style mount.

12. The device of claim 11, wherein the pinch clamp style mount allows for movement of the hot knife handle.

13. The device of claim 11, wherein the pinch clamp style mount allows for rotational movement of the hot knife handle.

14. The device of claim 9, wherein the robotic arm is configured to move the knife tip to a desired position for a pre-determined amount of time.

* * * * *